United States Patent
Sato

[11] 3,805,609
[45] Apr. 23, 1974

[54] FLOW METER
[75] Inventor: Tetsuya Sato, Ibo-gun, Japan
[73] Assignee: Kabushiki Kaisha Teikoku Denki Seisakusho, Osaka City, Japan
[22] Filed: Oct. 21, 1971
[21] Appl. No.: 191,367

[30] Foreign Application Priority Data
Oct. 24, 1970 Japan.............................. 45-93787

[52] U.S. Cl. .............................. 73/194 C, 251/212
[51] Int. Cl. ................................................ G01f 3/12
[58] Field of Search.......... 73/194, 194 C, 199, 255; 251/212

[56] References Cited
UNITED STATES PATENTS
| | | | |
|---|---|---|---|
| 3,564,919 | 2/1971 | Varga | 73/258 |
| 3,415,118 | 12/1968 | McQueen et al. | 73/199 |
| 2,518,149 | 8/1950 | Kearsley | 73/194 C |
| 2,233,983 | 3/1941 | Kice | 251/212 |
| 3,592,240 | 7/1971 | Hedrick et al. | 251/212 |

FOREIGN PATENTS OR APPLICATIONS
| | | | |
|---|---|---|---|
| 4,420,898 | 2/1966 | Japan | 73/194 C |
| 149,639 | 7/1961 | U.S.S.R. | 73/194 R |
| 1,209,547 | 10/1970 | Great Britain | 73/194 E |

Primary Examiner—Richard C. Queisser
Assistant Examiner—Arthur E. Korkosz
Attorney, Agent, or Firm—Stevens, Davis, Miller & Mosher

[57] ABSTRACT

A flow meter comprising a swirling stream path provided in a fluid flow passageway to form a part thereof, at least one rotary body disposed in the swirling stream path and adapted to move in a rotary motion without being brought into contact with a side wall of the swirling stream path by the swirling stream, and a sensing element for sensing the number of revolutions of at least one rotary body. The flow rate of a fluid passing through the swirling stream path can be measured from the number of revolutions of the rotary body along the swirling stream path.

1 Claim, 10 Drawing Figures

FLOW METER

This invention relates to flow meters, and more particularly it is concerned with a flow meter of the type utilizing the rotary movements of the rotary bodies in the path of swirling stream of a fluid which are concentric with the swirling stream so that the flow rate of the fluid can be measured.

Known flow meters include flow meters of the vane type, volume type, differential pressure type, area type and weir type as well as electromagnetic flow meters and mass flow meters. Of these known flow meters, those of the vane type require a shaft and a bearing for supporting rotary vanes disposed in a conduit through which a fluid to be measured passes. Wear of these elements is a vital factor in the development of errors in the measurements. The flow meters of this type also require means for reducing thrust. In addition, their construction is complex and precision machining and assembly of the parts are essential, resulting in an increase in production cost.

Disadvantages similar to those of the flow meters of the vane type are associated with the flow meters of the volume type. In addition, the flow meters of the volume type have a larger number of parts in sliding contact or meshing engagement with each other, so that they do not lend themselves for use with pipes handling a so-called slurry which contains fine solid particles in a fluid.

Flow meters of the differential pressure type have the disadvantage of failing to give correct readings when the differential pressure measuring section is jammed with a slurry. Errors in measurements rapidly increase when wear is caused on the orifice and throttle portion, no matter how slight the wear may be. For these reasons, the flow meters of the differential pressure type cannot be used with pipes handling a slurry.

Flow meters of the area type include an orifice and a hinged portion for supporting a flow intercepting plate, and their construction makes them not suited to handle a slurry for practical purposes.

Flow meters of other types also have disadvantages: The weir type requires a large area for installation; and mass flow meters and electromagnetic flow meters are high in cost.

There is another type of flow meter such as the one disclosed in U.S. Pat. No. 2,518,149 which is based on principles for measuring the flow rate other than those on which all the aforementioned conventional flow meters are based, and in which at least one spherical rotary body is disposed in a swirling stream of a fluid and a sensing element is mounted above the swirling stream. In this type, a rotary body or bodies are adapted to move in rolling motion along a track provided on a side wall of a casing constituting a path of a swirling stream of a fluid. This type of flow meter of the prior art is not suited for practical use, because centrifugal forces increasing in proportion to the square of a rate of increase in flow rate of the fluid act on the rotary body or bodies moving in rolling motion, thereby bringing about early wear and deformation of the rotary body or bodies. This tendency is increased when the fluid handled contains a slurry therein.

This invention obviates the various disadvantages of conventional flow meters of the rotary body type.

Accordingly, an object of this invention is to provide a flow meter of the type described which has linear flow rate characteristics, improved response and high reliability.

Another object is to provide a flow meter of the type described which is simple in construction, sturdy in structure and low in cost, and which seldom gets out of order.

Another object is to provide a flow meter of the type described which can handle a liquid containing crystals or a slurry, and which is high in durability and reliability.

Still another object is to provide a flow meter of the type described which can perform a flow regulating operation to minimize pressure loss, and which can increase the number of revolutions of the rotary body or bodies so that accurate measurements of the flow rate can be made. dr Additional objects as well as features and advantages of this invention will become evident from the description set forth hereinafter when considered in conjunction with the accompanying drawings, in which.

Figure 2:
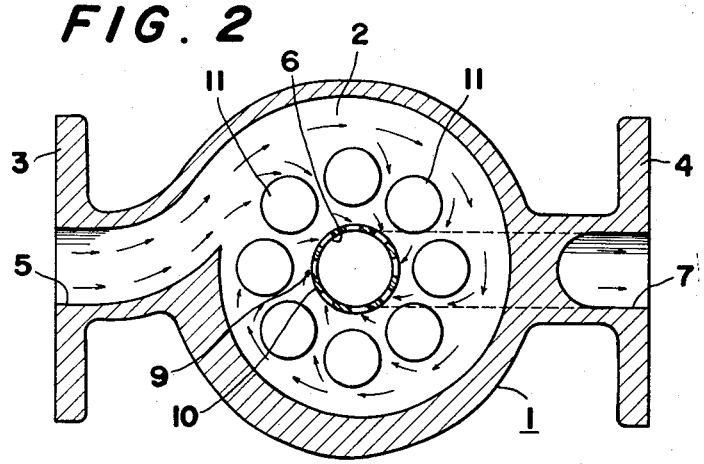
FIG. 2 is a transverse sectional plan view taken along the line A—A of FIG. 1.
Figure 1:
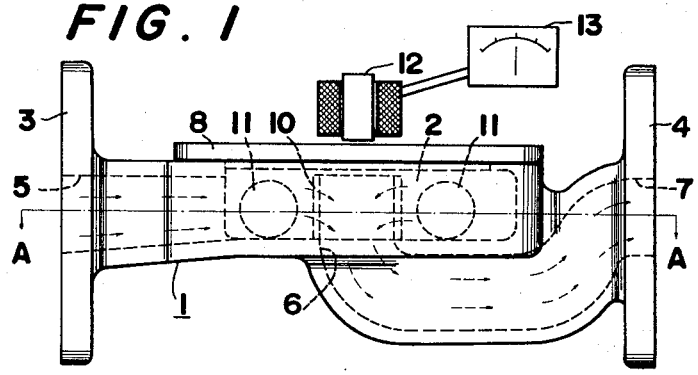
FIG. 1 is a front elevation of the flow meter comprising one embodiment of this invention.
Figure 3:
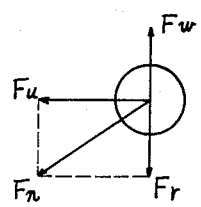
FIG. 3 is a diagrammatic representation of the vector of the forces acting on a rotary body.

In FIG. 1 and FIG. 2 showing one embodiment of this invention, 1 generally designates a flow meter proper which is formed with a swirling stream path 2 in its central portion. Flanges 3 and 4 are formed on opposite ends of flow meter proper 1 for connection to pipes. One flange 3 is formed at its center with an inlet port 5 which is contiguous with a wall surface of swirling stream path 2 to provide for smooth flow of the stream. Swirling stream path 2 surrounds an outlet port 6 disposed in the center thereof and contiguous with a duct connected to a delivery port 7 formed in the other flange 4.

Swirling stream path 2 is open at its top. A cover 8 is mounted on the open top of swirling stream path 2 and fixed to flow meter proper 1 by bolts, nuts and a packing (not shown) to provide an airtight or liquid-tight seal to the swirling stream path.

A cylindrical wall member 10 formed therein with openings 9 is disposed in the swirling stream path in a position in which it is adjacent outlet port 6. Cylindrical wall member 10 may be fabricated as by bending a perforated metallic sheet in cylinder form.

One or a plurality of spherical rotary bodies 11 are disposed in swirling stream path 2 for free rotary movement along the swirling stream path 2.

A sensing element 12 is mounted on the upper surface of cover 8 and connected to an indicator 13.

The operation of the embodiment of this invention constructed as aforementioned will now be described.

A fluid, whose flow rate is to be measured, is introduced into flow meter 1 through inlet port 5, moves in a swirling stream along swirling stream path 2 while moving rotary bodies 11 in rotary motion, and passes through the openings 9 in cylindrical wall member 10 into outlet port 6. The fluid moves from outlet port 6 through the duct to delivery port 7 from which it is delivered to a destination.

Assuming that the forces acting on each rotary body 11 comprise a force $Fn$ directed in the same direction as the stream and a circumferentially directed component $Fu$ and a radially directed component $Fr$ of the force $Fn$, the concentric circular movement of rotary body 11 will take place at a point where a centrifugal force $Fw$ and radially directed component $Fr$ balance. Accordingly, if the flow rate increases, the force $Fn$ directed in the same direction as the stream will increase in proportion to the increase in flow rate. This causes an increase in the circumferentially directed component $Fu$ which in turn causes an increase in the number of revolutions of rotary body 11 and an increase in the centrifugal force $Fw$. Rotary body 11 is maintained in rotation by the balancing of the increased centrifugal force $Fw$ with the radially directed component $Fr$.

The rotary movements of rotary bodies 11 are detected by sensing element 12 which issues a signal to indicator 13 so that the latter may indicate a flow rate.

The aforementioned description will be supplemented by theoretical explanation as follows:

A flow rate of a fluid in swirling stream path 2 can be expressed by the following formula:

$$U_r = U_o(r/r_o)^n \tag{1}$$

where $U_r$ is the tangential velocity of the fluid at a point of the radius $r$ from the center of the swirling, $U_o$ is the tangential velocity of the fluid at the outermost side $r_o$ of swirling stream path 2, $n=+1$ is the solid of infinite viscosity, and $n=-1$ is the solid of zero viscosity.

Assuming that the mass of a rotary body 11 is $m$, the centrifugal force $F_w$ acting on the rotary body 11 can be expressed by the following formula:

$$F_w = m(U_r^2/r) = (m/r)U_o^2(r/r_o)^{2n} \tag{2}$$

On the other hand, the radially directed component of the flow rate $U_{rm}$ can be expressed by the following formula:

$$U_{rm} = U_{om}(r_o/r) \tag{3}$$

where $U_{om}$ is the radially directed component of the flow rate at the outermost side $r_o$ of swirling stream path 2.

The force $F_r$ exerted by the fluid on the rotary body can be expressed by the following formula in view of the above formulas:

$$F_r = C_x \cdot S(\rho U_{rm}^2/2) = (C_x \cdot S \rho/2)(U_{om} \cdot r_o/r)^2 \tag{4}$$

where $C_x$ is the front surface resistance coefficient of rotary body 11, $S$ is the sectional area of rotary body 11, and $\rho$ is the density of the fluid to be measured.

Since the centrifugal force $F_w$ and radially directed component $F_r$ can be expressed by the formula (2) and formula (4) respectively, rotary body 11 rotates in a position of radius $r$ which simultaneously satisfies the aforesaid two equations.

To accomplish this, the following conditions must be met:

$$\text{At } r_o, \; F_{wo} < F_{ro} \tag{5}$$

$$\text{At } r_i, \; F_{wi} > F_{ri} \tag{6}$$

where $r_i$ is a radius when rotary body 11 rotates while being in contact with cylindrical wall member 10.

From formula (4), the following formula derives:

$$F_{ro} < F_{ri} \tag{7}$$

Thus, from formulas (5), (6) and (7), the following relation must hold:

$$F_{wo} < F_{wi} \tag{8}$$

Figure 4:
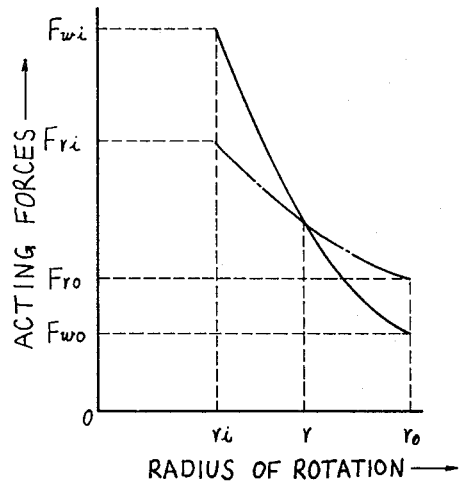
FIG. 4 is a diagram showing the lines of forces acting on a rotary body.

This relation is illustrated in FIG. 4.

In order to satisfy the relation set forth in formula (8), the value of $n$ in formula (2) should be at least $$n < \frac{1}{2} \tag{9}$$

In working this invention, the fluid to be measured need be a viscous liquid satisfying formula (9). In view of the values of $m$ in equation (2) and the value of $\rho$ in equation (4), it is necessary that the specific weight of the rotary body 11 be selected in a certain range in accord with the density of the fluid whose flow rate is to be measured.

Results of experiments conducted by me show that the number of revolutions of the rotary body 11 which satisfies the aforementioned conditions and the flow rate have a linearly proportional relationship, and that the rotary body 11 rotates while being maintained in a substantially constant position, with the radius $r$ of the circle of revolution satisfying the formula $r_o > r > r_i$ throughout the entire zone in which measurement is carried out.

Stated differently, it is shown that rotary body 11 moves in concentric circular motion along the path of the swirling stream disposed between the side wall of flow meter proper 1 and the cylindrical wall member 10 disposed adjacent outlet port 6 without coming into contact with them, regardless of an increase or decrease in the flow rate, with the angular velocity of the rotary body being linearly proportional to the flow rate.

Ideally, rotary bodies 11 would move in rotary motion while being maintained in perfect floating condition if the specific weight of rotary bodies 11 were selected to be equal to the specific weight of the fluid. Even if there is a slight difference between the rotary bodies and fluid in specific weight, very little deformation and damage are caused on rotary bodies 11 because they roll on a planar plate of flow meter 1 or cover 8 under a very low load condition having nothing to do with centrifugal forces, thereby ensuring that the flow meter according to this invention has a long service life.

The flow meter according to this invention is further characterized by being provided with means for minimizing pressure loss of the flow meter. This feature will be explained with reference to FIG. 5 et. seq.

Figure 5:
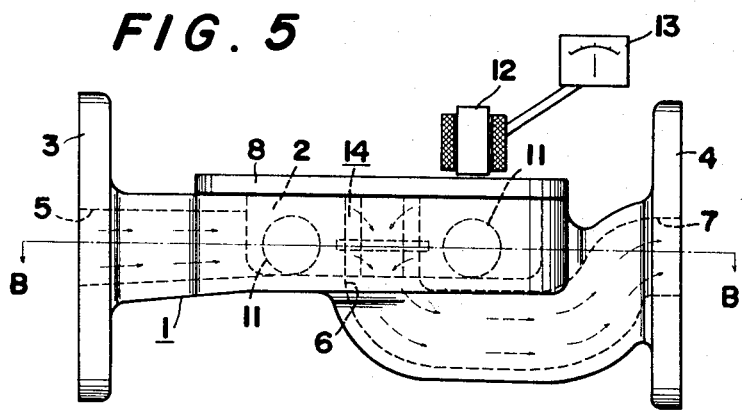
FIG. 5 is a front elevation of the flow meter comprising another embodiment of this invention.
Figure 6:
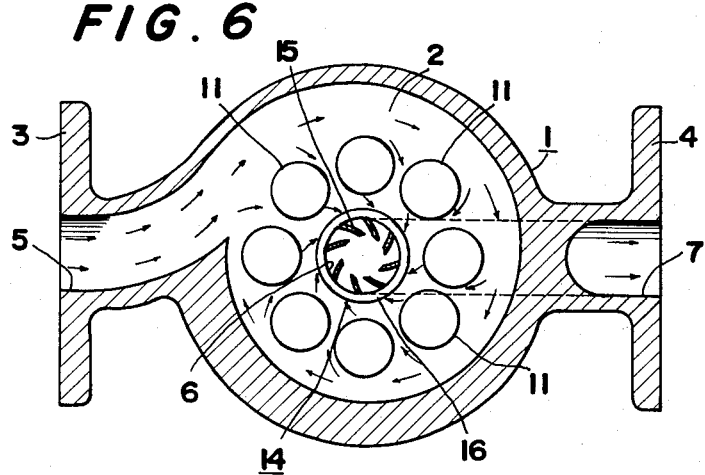
FIG. 6 is a transverse sectional plan view taken along the line B—B of FIG. 5.

The flow meter shown in FIG. 5 and FIG. 6 is similar to the flow meter shown in FIG. 1 and FIG. 2 except for the fact that a flow regulating means 14 is provided in a position in which swirling stream path 2 is connected to outlet port 6. Therefore, similar parts in FIGS. 1, 2, 5 and 6 are designated by like reference characters.

Figure 7:
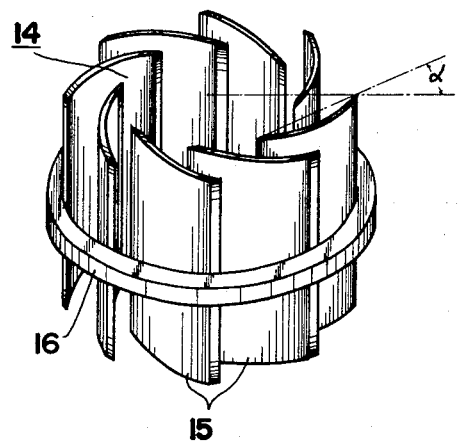
FIG. 7 is a perspective view of the flow regulating means of the flow meter.

The flow regulating means 14 may comprise, as best shown in FIG. 7, a plurality of guide vanes 15 disposed at a predetermined angle $\alpha$ with respect to the center of outlet port 6. Guide vanes 15 may be planar or curved. When curved, guide vanes 15 may have any curvature as desired.

Guide vanes 15 are secured at their outer edges to a protective ring 16 which supports vanes 15 substantially integrally. Protective ring 16 performs the functions of precluding damage which might be caused on rotary bodies 11 and guide vanes 15 when the former directly impinge on the latter by some cause and maintaining guide vanes 15 in predetermined positions.

The flow regulating means 14 operates such that when a fluid whose flow rate is to be measured is introduced through inlet port 5 into swirling stream path 2 and flows toward guide vanes 15 after moving in a swirling motion along path 2, the direction of flow of the fluid is changed by guide vanes 15 in flowing into outlet port 6, from which the fluid moves through the duct toward delivery port 7.

Rotary bodies 11 rotate in proportion to the flow rate of the fluid. The number of revolutions of rotary bodies 11 is detected by detecting element 12 and indicated by indicator 13, so that readings of instant flow rate or the integral of flow rate with respect to time can be made.

Figure 8:
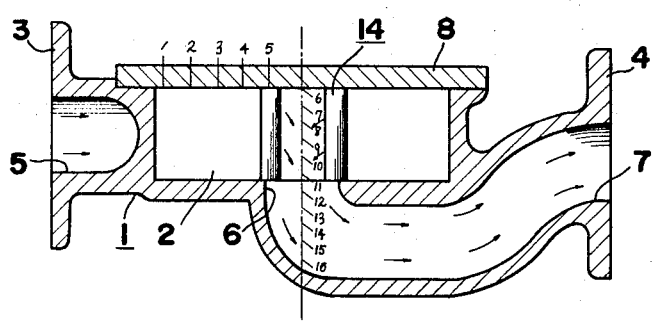
FIG. 8 is a vertical sectional front elevation showing the pressure measuring points.

It has been ascertained by experiments with water of normal temperature that flow regulating means 14 can achieve marked results in precluding a reduction in pressure loss. Its characteristics are as follows:

Pressure was measured by means of a pressure measuring pipe having an open lower end at 16 measuring points selected in the swirling stream path 2, flow regulating means 14 and outlet port 6 of flow meter 1 as shown in FIG. 8 while the flow rate of a fluid was varied to 100 l/min, 200 l/min and 300 l/min. The results are shown in FIG. 9 in which solid line curves represent changes in pressure occurring when flow regulation means 14 is provided and broken line curves represent changes in pressure occurring when no flow regulation means is provided.

Figure 9:
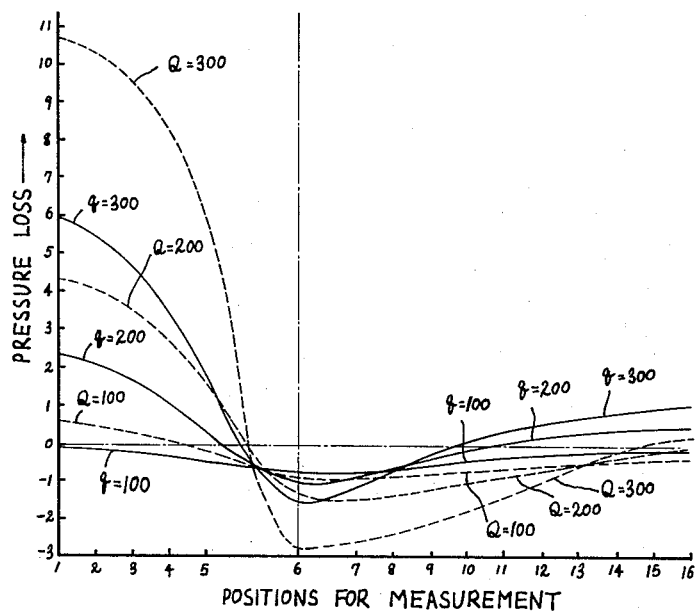
FIG. 9 is a diagram showing the lines of pressures at the pressure measuring points.

It will be seen from FIG. 9 that pressure shows a sudden change in measuring positions 1 to 6 and a slight increase in measuring positions 6 to 16. It will also be see that changes in pressure are smaller when flow regulation means 14 is provided than when no flow regulation means is provided, such changes being particularly smaller in measuring positions 1 to 6. Particularly noteworthy is the fact that when the flow rate is 300 l/min, a difference between the maximum pressure at the measuring position 1 and the minimum pressure at the measuring position 6 is 7.5 mm water column when flow regulation means 14 is provided as compared with 13.3 mm water column when no flow regulation means is provided.

Figure 10:
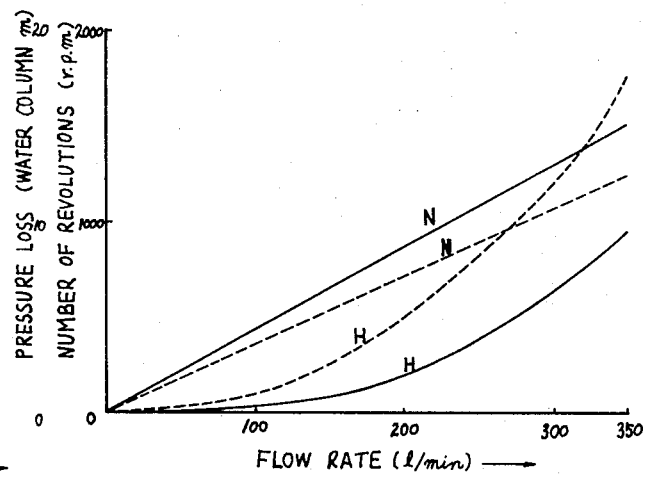
FIG. 10 is a diagrammatic representation of characteristics showing the number of revolutions of the rotary bodies and pressure loss in relation to the flow rate.

FIG. 10 shows the relation between the pressure differential at fluid inlet port 5 and fluid delivery port 7 or pressure loss H of the flow meter and flow rate of a fluid and the relation between the number of revolutions N of rotary bodies 11 and the flow rate of the fluid. The characteristics curves of FIG. 10 show that pressure loss H is much lower and the increase in the number of revolutions N is slightly higher when flow regulation means 14 is provided as indicated by solid lines than when no flow regulation means is provided as indicated by broken lines. This shows that the provision of flow regulation means 14 permits obtaining accurate readings of the flow rate.

From the foregoing description, it will be appreciated that this invention constructed as aforementioned can provide a flow meter of the rotating body type which is simple and solid in construction and low in cost, and which has good linear flow rate characteristics, prompt response and high reliability. The flow meter according to this invention can handle a liquid containing crystals or a slurry. It has a long service life, and its pressure loss is very small. It has high practical value in industrial production.

What is claimed is:

1. A flow meter comprising a casing having an inner wall, a substantially annular swirling stream path provided in said casing, said swirling stream path being formed with an inlet port at its side and an outlet port at its center, a plurality of spherical rotary bodies disposed in said swirling stream path and having such a specific gravity as to balance the centrifugal force provided by rotary motion with the radially inwardly directed force provided by a swirling stream of fluid so as to move in rotary motion without being brought into contact with said inner wall of said casing by the swirling stream of fluid, a sensing element provided outside said casing in which said swirling stream path is provided for detecting the number of revolutions of said rotary bodies, an indicator for indicating a flow rate upon receipt of a signal from said sensing element, and flow regulating means comprising a plurality of guide vanes disposed adjacent said outlet port of said swirling stream path and at a predetermined angle with respect to the center of the outlet port.

* * * * *